United States Patent [19]

Bücker

[11] 4,257,568

[45] Mar. 24, 1981

[54] PREINFLATABLE EXPANSION DEVICE FOR LOW ALTITUDE ESCAPE OR SPORTING PARACHUTE

[76] Inventor: Henrique O. Bücker, Box 18394, Sao Paulo SP, Brazil, 01000

[21] Appl. No.: 20,476

[22] Filed: Mar. 14, 1979

[30] Foreign Application Priority Data

Mar. 30, 1978 [BR] Brazil .............................. PI 7802004

[51] Int. Cl.³ ............................................ B64D 17/72
[52] U.S. Cl. ........................................ 244/146; 182/3; 244/149; 244/152
[58] Field of Search ............... 244/142, 146, 147, 149, 244/152, 139, DIG. 2, 148; 182/3, 48; 135/20 B; 46/86

[56] References Cited

U.S. PATENT DOCUMENTS

| 1,081,137 | 12/1913 | von Augezd ........................ 244/147 |
| 1,168,465 | 1/1916 | Bedinger .............................. 244/147 |
| 1,310,693 | 7/1919 | Donnelly ............................. 244/146 |
| 1,337,788 | 4/1920 | Mott .................................... 244/146 |
| 4,105,173 | 8/1978 | Bucker ................................ 244/146 |

FOREIGN PATENT DOCUMENTS 271771 11/1911 Fed. Rep. of Germany .......... 244/146

Primary Examiner—Galen L. Barefoot

[57] ABSTRACT

The improvement refers to an inflatable device for quick expansion of parachutes for low altitude jumping, comprising elements of bags firmly connected to the canopy and sheathed into by tubes of the expansion structure, as well as lines tied between those bags and tubes, the object of the improvement being to permit a reduction of the dimensions of the expansion structure and to increase its expansion speed.

3 Claims, 5 Drawing Figures

Fig. 1
Fig. 2
Fig. 3
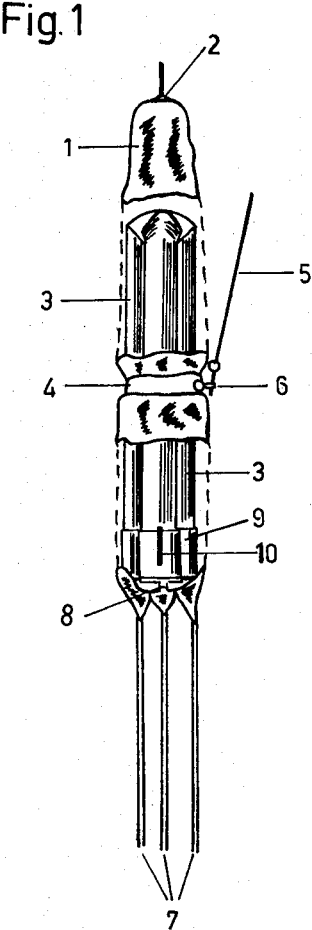
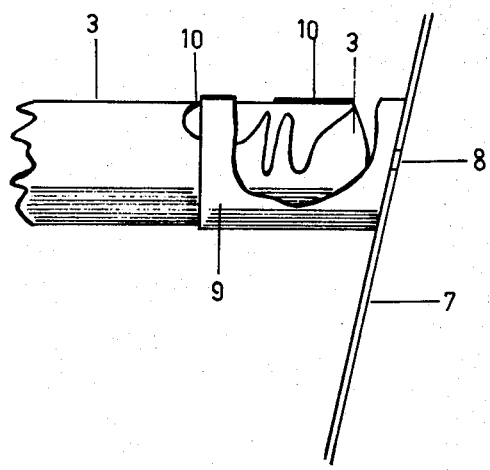
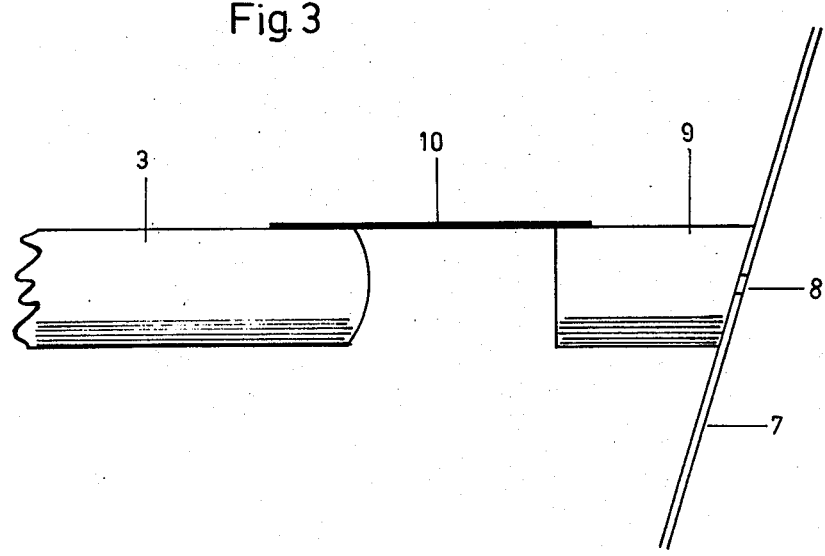

PREINFLATABLE EXPANSION DEVICE FOR LOW ALTITUDE ESCAPE OR SPORTING PARACHUTE

BACKGROUND OF THE INVENTION

Conventional parachutes include canopies that can have different shapes and can be made of different materials, as well as suspension lines with a user's harness pending therefrom.

Preinflatable parachutes are equipped with inflatable flexible tube structures of different shapes which are connected to the canopy and can be folded and preinflated with gas in such a way that they accumulate potential energy and perform like springs when retaining devices which keep them folded are released, and consequently expand the canopy almost instantaneously at the beginning of the jump. Please refer to U.S. Pat. No. 4,105,173.

SUMMARY OF THE INVENTION

The invention refers to an improvement in a preinflatable expansion device for low altitude jumping parachutes which can be inflated previously to jumping from buildings, windows, helicopters and hang gliders, with particular reference to its connection to the canopy and suspension lines, such improvement permitting a substantial reduction of the tube structure's dimensions and weight as well as the amount of inflation gas. In addition, the improvement also decreases the cost of manufacturing and the expansion speed of the structure and canopy combination.

These and other features and advantages of the invention will become apparent during the course of the following description.

BRIEF DESCRIPTION OF DRAWING FIGURES

FIG. 1 is a lateral elevation view, partly broken away, of a preinflatable parachute showing the expansion structure of tubes filled with gas and details of the system which connects it to the canopy;

FIG. 2 is a partly schematic and broken away view showing the extremity of one of the tubes of the expansion structure and details of the system used to connect it to the canopy, as assembled before the jump;

FIG. 3 is a partly schematic view showing the extremity of one of the tubes of the expansion structure and details of the system used to connect it to the canopy, as seen after the jump and the canopy's deployment by the air;

DETAILED DESCRIPTION

Figure 4:
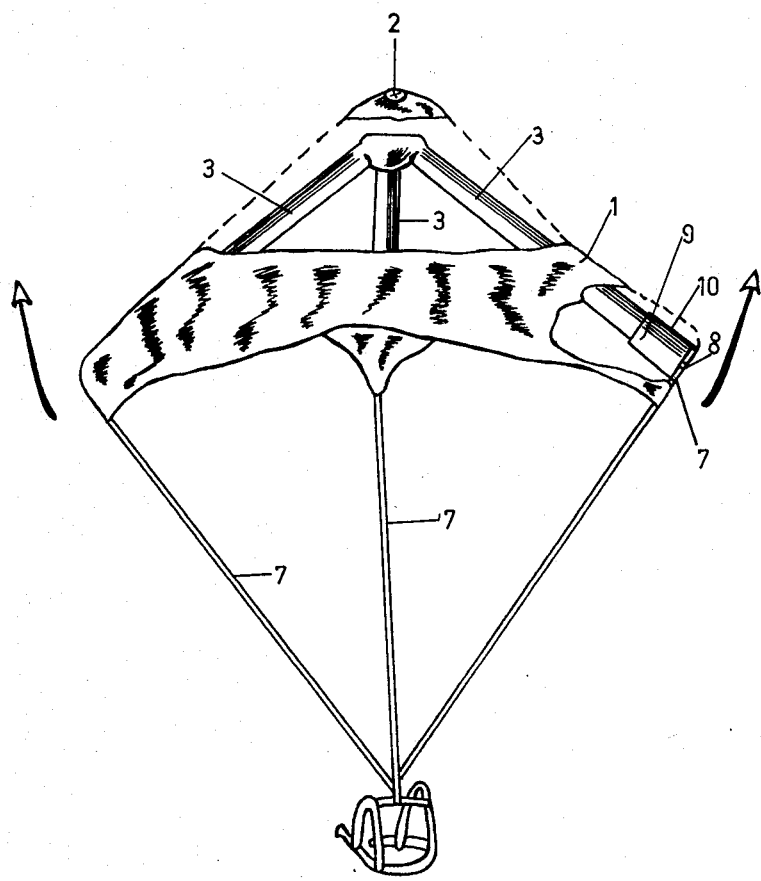
FIG. 4 is a lateral elevation and partly broken away view of the parachute of FIG. 1, showing details of the system used to connect the expansion tubes structure to the canopy during the expansion stage.

Referring to the drawings in detail, FIG. 1 depicts a preinflatable parachute with its expansion tubes structure already filled with gas before the jump.

The canopy 1 of the parachute has its apex 2 at the top and the skirt 8 at the bottom with suspension lines 7 pending therefrom. The canopy 1 can be a type with a reduced number of non-entangling suspension lines.

The canopy 1 of the parachute and the folded tubes 3 of the expansion structure which it envelopes, are held together tightly by a retaining device 4 consisting of a belt with a pin and lodge which can be released on pulling line 5.

The tubes 3 are filled with gas under pressure to an adequate degree. The partly broken away canopy discloses how the communicating tubes 3 of the expansion structure are folded. In this case the structure of tubes 3 takes a radial shape on being released.

The lower broken away part shows the extremities of the inflated tubes 3 sheathed loosely in the devices consisting of bags 9 and lines 10 which connect them to the canopy 1 and suspension lines 7. Such bags 9 and lines 10 are in number equal to those of tubes 3 and are made of flexible resistant materials.

The lines 10 are connected by their ends to the bags 9 and the extremities of tubes 3. The bottoms of bags 9 are firmly tied to the suspension lines 7 and to the canopy's skirt 8, preferably at equidistant points.

FIG. 2 shows partly broken away with details the extremity of one of the expansion tubes 3 already inflated and loosely sheathed up to the bottom of the bag 9 of the connecting device, as assembled before the jump. It also shows the connecting device's line 10 having its ends tied to the extremity of the expansion tube 3 and the open part of the bag 9, whose bottom in turn is firmly tied to the suspension line 7 and skirt 8.

The lines 10 are sufficiently long to avoid that the canopy 1 is restrained by the structure of tubes 3, therefore permitting it to assume its natural shape during descent. In other words, the projected area or master section of the canopy 1 which is the inner part of the plane passing throgh the skirt 8, is not decreased though it is larger than the expansion structure contained in that same plane.

The FIG. 3 is similar to FIG. 2, however showing the extremity of an expansion tube 3 sheathed out from the bag 9 and a stretched line 10 connecting it to a suspension line 7 and skirt 8 after the jump and canopy's complete deployment by the inrushing air during descent.

The FIG. 4 depicts a preinflated parachute just after the restraining device 4 was released. Once released, the structure of tubes 3 unbends almost instantaneously thereby expanding the canopy 1 to which its extremities are connected by means of bags 9 and lines 10.

The extremities effect pressure on bags 9 perpendicularly to their axis during the expansion, such that at this stage they do not unsheath though there is sufficient gap between them to permit sliding.

Figure 5:
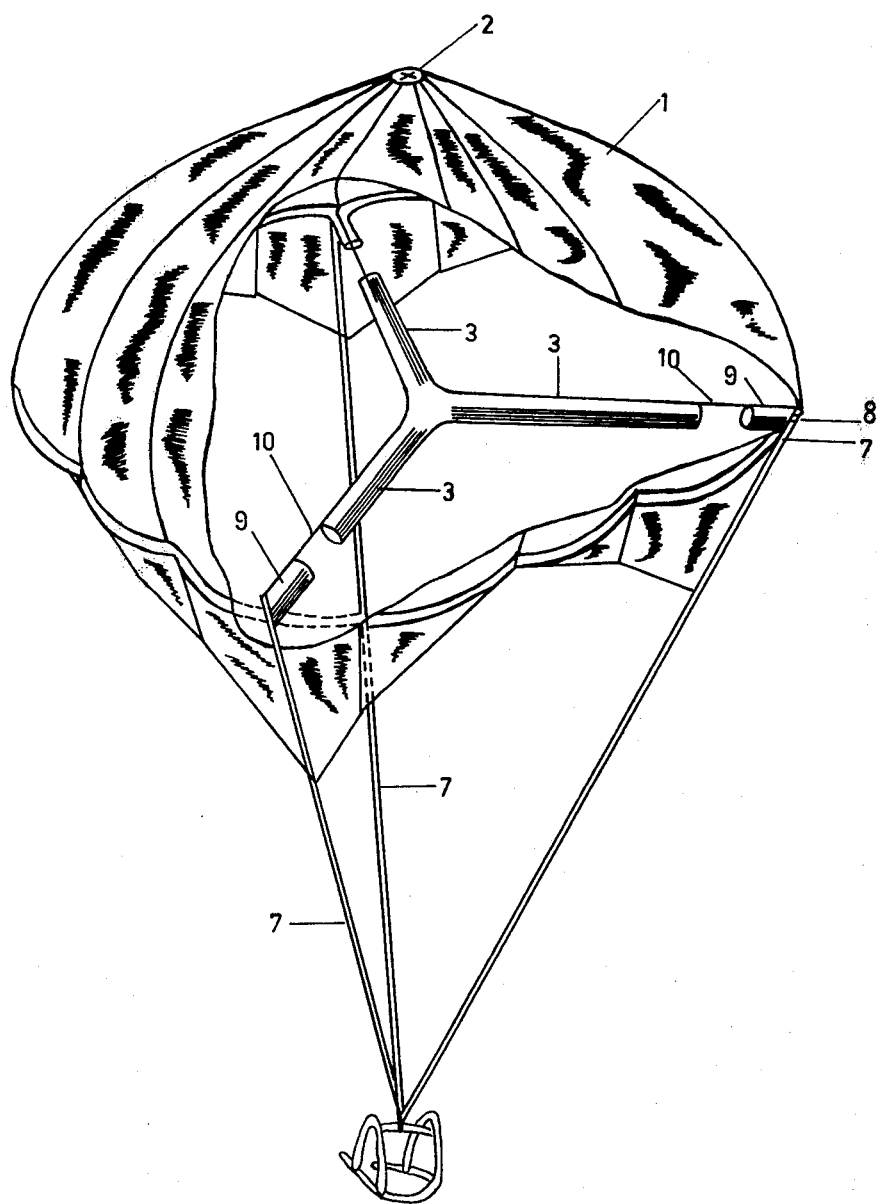
FIG. 5 is a perspective and partly broken away view of the parachute of FIG. 1, showing details of the system used to connect the expansion tubes structure to the canopy after complete deployment.

Finally, FIG. 5 shows a preinflatable parachute in perspective and partly broken away, in which the expansion tubes 3 are completelly straightened and unsheathed from the bags 9, but still connected to the deployed canopy 1 through the lines 10.

Forces now act axially along the tubes 3 and bags 9 so that they slide and unsheath during the deployment of the canopy 1 caused by the inrushing air at the beginning of descent.

The lines 10 keep the structure of tubes 3 tied on to the canopy 1 during descent and are sufficiently long to avoid that its normal descending master section is restrained.

It is to be understood that the principles of the present invention can be applied to inflatable parachutes having structures of tubes of shapes different from those depicted in the enclosed drawings. For example they can have annular and poligonal shapes and their combinations.

It is also to be understood that the canopy can be conventional, cross-shaped or have other existing shapes.

The connection devices between the expansion tubes 3 and the suspension lines 7 and canopy's skirt 8 may be constituted of similar elements other than the bags 9 and lines 10 which permit the expansion of the canopy 1 when the tubes 3 straighten and subsequently unsheath during the deployment of the canopy 1 caused by the inrushing external air, allowing it to take its normal descent shape.

By means of the present invention, a preinflatable parachute can be made with considerably smaller, lighter and cheaper canopy expansion tubes, such that the equipment becomes more portable and useful for various operations and sports, besides becoming less expensive. In addition, less gas is needed to inflate the expansion tubes structure.

Finally, shorter tubes 3 result in faster expansion speeds for equal internal pressures, with obvious advantages.

I claim:

1. In an inflatable type expansion device for low altitude escape or sporting parachute, said expansion device having an inflatable tubing frame, means to inflate said tubing frame, a retaining device to maintain said tubing frame in a folded position enveloped by a parachute canopy when preinflated, means to release said retaining device, the improvement comprising:
    said inflatable tubing frame's projected area being smaller than said canopy's projected area,
    attaching devices to hold said canopy and tubing frame together in a non-fixed relationship to expand said canopy when said tubing frame is inflated and straightened and to permit said canopy to disengage from said tubing frame when said canopy deploys, thereby permitting said canopy to deploy unrestrained, and
    means to maintain said tubing frame suspended underneath said canopy after said canopy deploys.

2. A device according to claim 1 wherein said attaching devices are flexible bags attached to said canopy which are sheathed into by said tubing frame to expand said canopy when straightened.

3. A device according to claim 1 wherein said suspension means are flexible lines to maintain said tubing frame suspended underneath said deployed canopy.

* * * * *